(12) United States Patent
Devarakonda et al.

(10) Patent No.: US 10,082,060 B2
(45) Date of Patent: Sep. 25, 2018

(54) ENHANCED PERFORMANCE OF A GAS TURBINE

(71) Applicant: General Electric Company, Schenectady, NY (US)

(72) Inventors: Maruthi Narasinga Rao Devarakonda, Waukesha, WI (US); Rachel Tarvin Farr, Houston, TX (US); Sahika Genc, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 14/973,445

(22) Filed: Dec. 17, 2015

(65) Prior Publication Data
US 2017/0175645 A1 Jun. 22, 2017

(51) Int. Cl.
*F02C 9/16* (2006.01)
*F01D 21/00* (2006.01)
*F01N 11/00* (2006.01)
*F01N 3/20* (2006.01)
*G05B 19/42* (2006.01)
*F02C 9/28* (2006.01)
*G05B 17/02* (2006.01)

(52) U.S. Cl.
CPC .............. *F01N 3/20* (2013.01); *F02C 9/28* (2013.01); *G05B 17/02* (2013.01); *F01N 2550/00* (2013.01); *F01N 2570/18* (2013.01); *F05D 2260/81* (2013.01); *F05D 2270/08* (2013.01); *F05D 2270/0831* (2013.01); *F05D 2270/71* (2013.01)

(58) Field of Classification Search
CPC ........................................................ F01N 3/20
USPC ........................................................ 700/287
See application file for complete search history.

(56) References Cited

U.S. PATENT DOCUMENTS

| | | | | |
|---|---|---|---|---|
| 9,650,934 B2* | 5/2017 | Pachner | .................. | F01N 3/208 |
| 2010/0275583 A1* | 11/2010 | Farrell | .................. | F01N 3/0205 |
| | | | | 60/285 |

(Continued)

OTHER PUBLICATIONS

Schmidhuber, Deep Learning in Neural Networks: An Overview Neural Networks 61, (2015), pp. 85-117; first published in ArXiv Oct. 8, 2014; (arXiv:1404.7828v4 [cs.NE] Oct. 8, 2014). retrieved from https://arxiv.org/pdf/1404.7828.pdf Nov. 16, 2017.*

(Continued)

*Primary Examiner* — Mohammad Ali
*Assistant Examiner* — Joshua Sanders
(74) *Attorney, Agent, or Firm* — Fletcher Yoder, P.C.

(57) ABSTRACT

In one embodiment, a system may include a gas turbine system. the gas turbine system includes a gas turbine, an after-treatment system that may receive exhaust gases from the gas turbine system, and a controller that may receive inputs and model operational behavior of an industrial plant based on the inputs. The industrial plant may include the gas turbine and the after-treatment system. The controller may also determine one or more operational parameter setpoints for the industrial plant, select the one or more operational parameter setpoints that reduce an output of a cost function, and apply the one or more operational parameter setpoints to control the industrial plant.

19 Claims, 5 Drawing Sheets

(56) References Cited

U.S. PATENT DOCUMENTS

| | | | | |
|---|---|---|---|---|
| 2011/0099985 A1* | 5/2011 | Yasui | ............... | F01N 3/208 60/287 |
| 2011/0232263 A1* | 9/2011 | Yasui | ............... | F01N 3/0842 60/274 |
| 2013/0067894 A1* | 3/2013 | Stewart | ............... | F01N 3/208 60/295 |
| 2016/0115839 A1* | 4/2016 | Abrol | ............... | F01N 3/208 60/776 |

OTHER PUBLICATIONS

U.S. Appl. No. 14/644,399, filed Mar. 11, 2015, Maruthi Narasinga Rao Devarakonda.

\* cited by examiner

ENHANCED PERFORMANCE OF A GAS TURBINE

BACKGROUND OF THE INVENTION

The subject matter disclosed herein relates to industrial control systems, and more specifically, to model based and/or data-driven control systems for turbines and after-treatment systems in industrial plants.

Certain systems, such as an industrial control system, may provide for capabilities that enable the control and analysis of a turbine system, after-treatment system, or bottoming cycle system. For example, the industrial control system may include controllers, field devices, and sensors storing data used in controlling the various systems. Certain industrial control systems may use modeling and simulation systems for enhancing the individual systems. However, oftentimes, the control systems do not consider the various systems in the industrial plant as a whole and the impact each system has on one another when determining operational parameter setpoints.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the techniques may encompass a variety of forms that may be similar to or different from the embodiments set forth below.

In one embodiment, a system may include a gas turbine system. the gas turbine system includes a gas turbine, an after-treatment system that may receive exhaust gases from the gas turbine system, and a controller that may receive inputs and model operational behavior of an industrial plant based on the inputs. The industrial plant may include the gas turbine and the after-treatment system. The controller may also determine one or more operational parameter setpoints for the industrial plant, select the one or more operational parameter setpoints that reduce an output of a cost function, and apply the one or more operational parameter setpoints to control the industrial plant.

In one embodiment, a method may include receiving, via a controller, inputs and modeling, via the controller, operational behavior of a gas turbine system based on the inputs. The gas turbine system may include an industrial plant that includes a gas turbine connected to an after-treatment system. The method may also include determining, via the controller, one or more operational parameter setpoints for the industrial plant, selecting, via the controller, the one or more operational parameter setpoints that minimize an output of a cost function, and applying, via the controller, the one or more operational parameter setpoints to control the industrial plant.

In one embodiment, a non-transitory computer-readable medium may have computer executable code stored thereon. The code may include instructions that, when executed by a processor, are configured to cause the processor to receive inputs and model operational behavior of a gas turbine system based on the inputs The gas turbine system may include an industrial plant that includes a gas turbine connected to an after-treatment system. The code may also include instructions that, when executed by the processor, are configured to determine one or more operational parameter setpoints for the industrial plant, select the one or more operational parameter setpoints that minimize an output of a cost function, and apply the one or more operational parameter setpoints to control the industrial plant.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
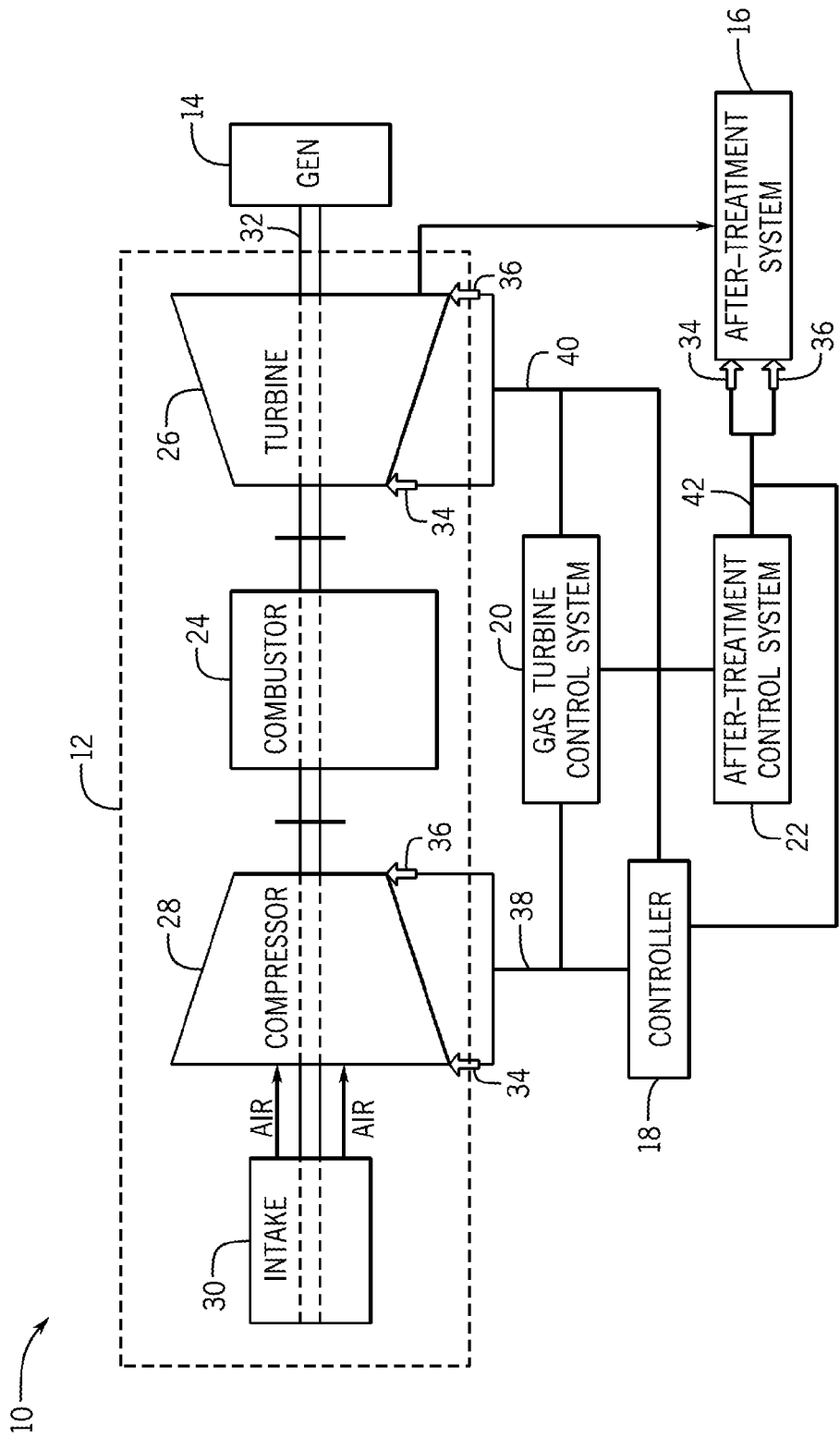
FIG. 1 is a bock diagram of an embodiment of an industrial control system suitable for model based and/or data-driven control of a gas turbine system, including a controller.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As previously discussed, model based control used in industrial control systems typically monitor and adjust operational parameter setpoints for individual components in a gas turbine system (e.g., a gas turbine, a after-treatment system, and/or a bottoming cycle system). Accordingly, some embodiments of the present disclosure relate to enhancing performance of the components of the gas turbine system as a whole. That is, the model based and/or data-driven control considers the interactions between the various components, such as the gas turbine and after-treatment system (e.g., oxidation catalysts (OxiCat) and selective catalytic reduction (SCR)), to enhance efficiency and/or emissions. It should be understood that the gas turbine system may be an industrial plant or may be a part of an industrial plant.

In some embodiments, a controller may use a closed-loop enhancer that performs simulations on a physics based model of the gas turbine system to find setpoints for operational parameters that minimize a cost function. The closed-loop enhancer may accept a number of inputs, such as gas turbine control inputs, measured variables of the gas turbine, after-treatment system control inputs, measured variables of the after-treatment system, and/or recommended setpoints from a data-driven enhancer. The closed-loop enhancer may output one or more recommended setpoints to the gas turbine control system and/or the after-treatment system control system. In some embodiments, the data-driven enhancer may be used to further enhance the operational parameter setpoints to provide the desired efficiency and/or emissions of the gas turbine system.

The data-driven enhancer may accept the one or more recommended setpoints from the closed-loop enhancer and use deep learning to inject sensor data into the physics based model. In some embodiments, deep learning may use a neural network to learn the gas turbine system model, including responses based on sensor data, and determine one or more observations and operational parameter setpoints that may achieve a desired response. Further, the data-driven enhancer may determine when there is a discrepancy between the recommended one or more observations, setpoints, and/or sensor data (e.g., stored in a database). Once the physics based model of the gas turbine system is generated by the closed-loop enhancer, the data-driven enhancer may analyze the recommended setpoints, current observations using the sensor data, and command new setpoints that can be applied to control the gas turbine system (e.g., gas turbine and/or after-treatment system). Through the feedback loop of the industrial control system, the closed-loop enhancer and/or the data-driven enhancer converge on a solution to provide to the gas turbine control system and/or the after-treatment control system to achieve the desired efficiency and/or emissions. Efficiency may refer to any aspect related to performance of the gas turbine (e.g., combustion efficiency, fuel efficiency, thermal efficiency, power use efficiency, power production efficiency, peak firing temperature efficiency, inlet temperature efficiency).

In particular, the disclosed embodiments may be particularly beneficial in certain scenarios. For example, the after-treatment system may use SCR to promote chemical reactions between nitric oxide (NOx) and ammonia gas ($NH_3$). The ammonia chemically reacts with the NOx to form nitrogen gas ($N_2$) and water vapor ($H_2O$), which is not harmful to the environment as emission gases. The level of ammonia storage in the catalyst of the after-treatment system may be tracked using an after-treatment control system. When there is a relatively high amount of ammonia stored (e.g., a level of ammonia that exceeds a threshold), it is undesirable to allow ammonia slip out of the SCR catalyst. As a result, the disclosed model based and/or data-driven control system can generate setpoints that command the gas turbine to produce more NOx (which increases the efficiency and fuel economy of the gas turbine), which will chemically react with and deplete the excess ammonia. This feature may enable maintaining compliance while improving fuel economy and efficiency of the gas turbine. As a result, $NOx/NH_3$ slip may be reduced and efficiency of the gas turbine may be increased.

In another scenario, the model based and/or data-driven control system may determine that ammonia is lower than desired amount (e.g., less than a threshold) at a steady state operating condition, the control system may command the turbine to output more carbon monoxide (CO) and lower NOx (ensuring one to one molar ratio for ammonia:NOx), such that the CO is oxidized in an oxidation catalyst upstream of the after-treatment system and NOx is reduced in the after-treatment system. In yet another scenario, the model based and/or data-driven control system may determine when the catalyst is aging in the after-treatment system by monitoring the ammonia stored in the catalyst and determining when the amount of ammonia is decreasing. In some embodiments, the model based and/or data-driven control system may generate setpoints that command the gas turbine to produce less NOx to balance with the ammonia level.

With the foregoing in mind, it may be useful to describe an embodiment of a power generation system incorporating techniques disclosed herein, such as a gas turbine system 10 illustrated in FIG. 1. As depicted, the system 10 may include a gas turbine 12, a generator 14, an after-treatment system 16, and a controller 18, a gas turbine control system 20, an after-treatment control system 22, a combustor 24. It should be noted that any suitable load may be connected to the gas turbine 12 and the present disclosure is not limited to the generator 14. Additionally, a bottoming cycle system may be connected to the gas turbine 12 in some embodiments. The controller 18 may be communicatively coupled via a wired or wireless connection to the gas turbine control system 20 and the after-treatment control system 22. As described in detail below, the controller 18 may perform model based control and/or data-driven control to determine one or more operational parameter setpoints to apply to the gas turbine 26 and/or the after-treatment system 16 using the gas turbine control system 20 and/or the after-treatment control system 22, respectively. It should be noted that, in some embodiments, the gas turbine control system 20 and the after-treatment control system 22 may not be included, and the controller 18 may directly interact with and control the gas turbine 12 and/or the after-treatment system 16.

The gas turbine 12 may include a combustor 24, a turbine 26, a compressor 28, and an intake 30. The combustor 24 may receive fuel that may be mixed with air, for combustion in a chamber within the combustor 24. This combustion may create hot pressurized exhaust gases. The combustor 24 may then direct the exhaust gases through the turbine 26 toward one or more exhaust outlets. Thus, the turbine 26 may be part of a rotor. As the exhaust gases pass through the turbine 26, the gases may force turbine blades to rotate a drive shaft 32 along an axis of the gas turbine 12. The drive shaft 32 may be coupled to various components of the gas turbine system 10, including not only components of the gas turbine 12, but also the generator 14. In certain embodiments, operational characteristics (e.g., pressure, temperature, flow rate, exhaust gas temperature, chemical makeup of the exhaust, etc.) may be sensed or estimated from the drive shaft 32 and/or the exhaust gases to generate a gas turbine system model, as described in more detail with respect to FIG. 2 below.

The exhaust gases may exit the gas turbine 12 and enter the connected after-treatment system 16. The after-treatment system 16 may include one or more catalysts. For example, the after-treatment system 16 may use SCR and/or OxiCat to treat the exhaust gases to comply with regulations. That is, the after-treatment system 16 may reduce one or more amounts of chemicals present in the emissions to render the emissions environmentally acceptable. As discussed above, the SCR may reduce the NOx using ammonia to produce $N_2$ and $H_2O$ from the NOx. The OxiCat may consist of a substrate made up of numerous small channels coated with a porous layer containing catalysts (e.g., platinum, palladium). As the exhaust gases traverse the channels, certain chemicals (e.g., carbon monoxide (CO), hydrocarbon (HC)) may react with oxygen to form carbon dioxide ($CO_2$) and water vapor, which can be emitted to the environment. As may be appreciated, there are certain emissions regulations that are to be complied with while operating a gas turbine system 10. The disclosed techniques may enable complying with the emissions regulations while operating the gas turbine system 10 efficiently.

The drive shaft 32 may include one or more shafts that may be, for example, concentrically aligned. The drive shaft 32 may include a shaft connecting the turbine 26 to the compressor 28 to form a rotor. Similarly, the compressor 28 may include blades coupled to the drive shaft 32. Thus, rotation of turbine blades in the turbine 26 causes the shaft connecting the turbine 26 to the compressor 28 to rotate blades within the compressor 28. Such a mechanism may compress air in the compressor 28. The rotation of blades in the compressor 28 may compress air that may be received via the air intake 30. The compressed air may be fed to the combustor 24 and mixed with fuel, for example, to allow for higher efficiency combustion. In certain embodiments, the gas turbine 12 may also generate mechanical power to drive the generator 14 to produce electrical power.

The gas turbine 12 may further include a number of sensors and field devices configured to monitor a plurality of physical and operational parameters related to the operation and performance of the power generation system 10. The sensors and field devices may include, for example, inlet sensors and field devices 34 and outlet sensors and field devices 36 (e.g., pressure transmitters, temperature transmitters, flow transmitters, fuel sensors, clearance sensors (e.g., measuring distances between rotating and stationary components)) positioned adjacent to, for example, the inlet and outlet portions of the turbine 26, the compressor 28, and the after-treatment system 16, respectively. The inlet sensors and field devices 34 and outlet sensors and field devices 36 may measure environmental conditions. For example, the inlet sensors and field devices 34 and outlet sensors and field devices 36 may measure the ambient temperature, ambient pressure, humidity, chemical makeup of exhaust gas, and air quality (e.g., particulate in air). The inlet sensors and field devices 34 and outlet sensors and field devices 36 may also monitor engine parameters related to the operation and performance of the gas turbine 12, such as, exhaust gas temperature, rotor speed, engine temperature, engine pressure, fuel temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 34 and 36 may also measure actuator information such as valve position, switch position, throttle position, and a geometry position of variable geometry components (e.g., air inlet).

The number of sensors and field devices 34 and 36 may also be configured to monitor physical and operational parameters related to various operational phases of the gas turbine 12, the generator 14, and the after-treatment system 16. Measurements taken by the number of sensors and field devices 34 and 36 may be transmitted via data bus lines 38 and 40, which may be communicatively coupled to the gas turbine control system 20 and/or the controller 18, and data bus line 42, which may be communicatively coupled to the after-treatment control system 22 and/or the controller 18. As will be discussed in greater detail, the controller 18 may use the measurements to calculate and generate models to actively control one or more of the gas turbine system 10 (e.g., gas turbine 12, the generator 14, and/or the after-treatment system 16).

Further, the sensors and field devices 34 and 36 may sense and transmit the measurements to the controller 18. For example, data bus line 38 may be utilized to transmit measurements from the compressor 28, while data bus line 40 may be utilized to transmit measurements from the turbine 26. It is to be understood that other sensors may be used, including combustor 24 sensors, intake 30 sensors, exhaust and load sensors. Likewise, any type of field devices may be used, including "smart" field devices that communicate to remote devices using a protocol such as, 802.15.4, Fieldbus Foundation®Profibus®, or HART® and/or WirelessHART® field devices.

As noted above, the gas turbine system 10 may include the controller 18. The controller 18 may be suitable for generating and implementing a variety of enhancers that use a control model of the gas turbine system 10 and/or data-driven analysis to determine enhanced setpoints for desired properties (e.g., efficiency, emissisons). That is, the controller 18 may enable enhancing gas turbine system 10 (e.g., gas turbine 12 and after-treatment system 16) level performance and emissions through the use of the disclosed techniques. The controller 18 may provide an operator interface through which an engineer or technician may monitor the components of the gas turbine system 10 such as components of the gas turbine 12 and the after-treatment system 16. Accordingly, the controller 18 may include one or more processors that may be used in processing readable and executable computer instructions, and one or more memories that may be used to store the readable and executable computer instructions and other data. These instructions may be encoded in programs stored in tangible non-transitory computer-readable medium such as the controller's 18 memory or other storage. In certain embodiments, the controller 18 may host various industrial control software, such as a human-machine interface (HMI) software, a manufacturing execution system (MES), a distributed control system (DCS), and/or a supervisor control and data acquisition (SCADA) system. The controller 18 may further support one or more industrial communications (e.g., wired or wireless) protocols such as, 802.15.4, Foundation Fieldbus® or HART® and/or WirelessHart®. For example, the controller 18 may support GE ControlST available from General Electric of Schenectady, N.Y. GE ControlST may be used to assign and distribute configuration tools and similar control data to various field equipment and devices. The gas turbine control system 20 and the after-treatment control system 22 may include similar components and software as the controller 18. For example, the gas turbine control system 20 and the after-treatment control system 22 may include one or more processors that execute computer instructions stored in one or more memories.

The controller 18, the gas turbine control system 20, and/or the after-treatment control system 22 may be communicatively coupled to the gas turbine system 10 data bus lines 38, 40, and 42, which may allow for communication between the controller 18, the gas turbine control system 20, the after-treatment control system 22, the inlet sensors, the outlet sensors, field devices 34 and 36, the gas turbine 12, and/or the after-treatment system 16. Indeed, the controller 18, the gas turbine control system 20, and/or the after-treatment control system 22 may support one or more operating systems capable of running and supporting various software applications and systems, as well as managing the various hardware (e.g., processors, storages, gateways, programmable logic controllers (PLCs), and so forth) that may be included as part of the controller 18, the gas turbine control system 20, and/or the after-treatment control system 22. For example, in certain embodiments, the controller 18 may support one or more model based control systems (e.g., that uses a model of the gas turbine system 10 including the gas turbine 12 and the after-treatment system 16) and/or data-driven algorithms.

Figure 2:
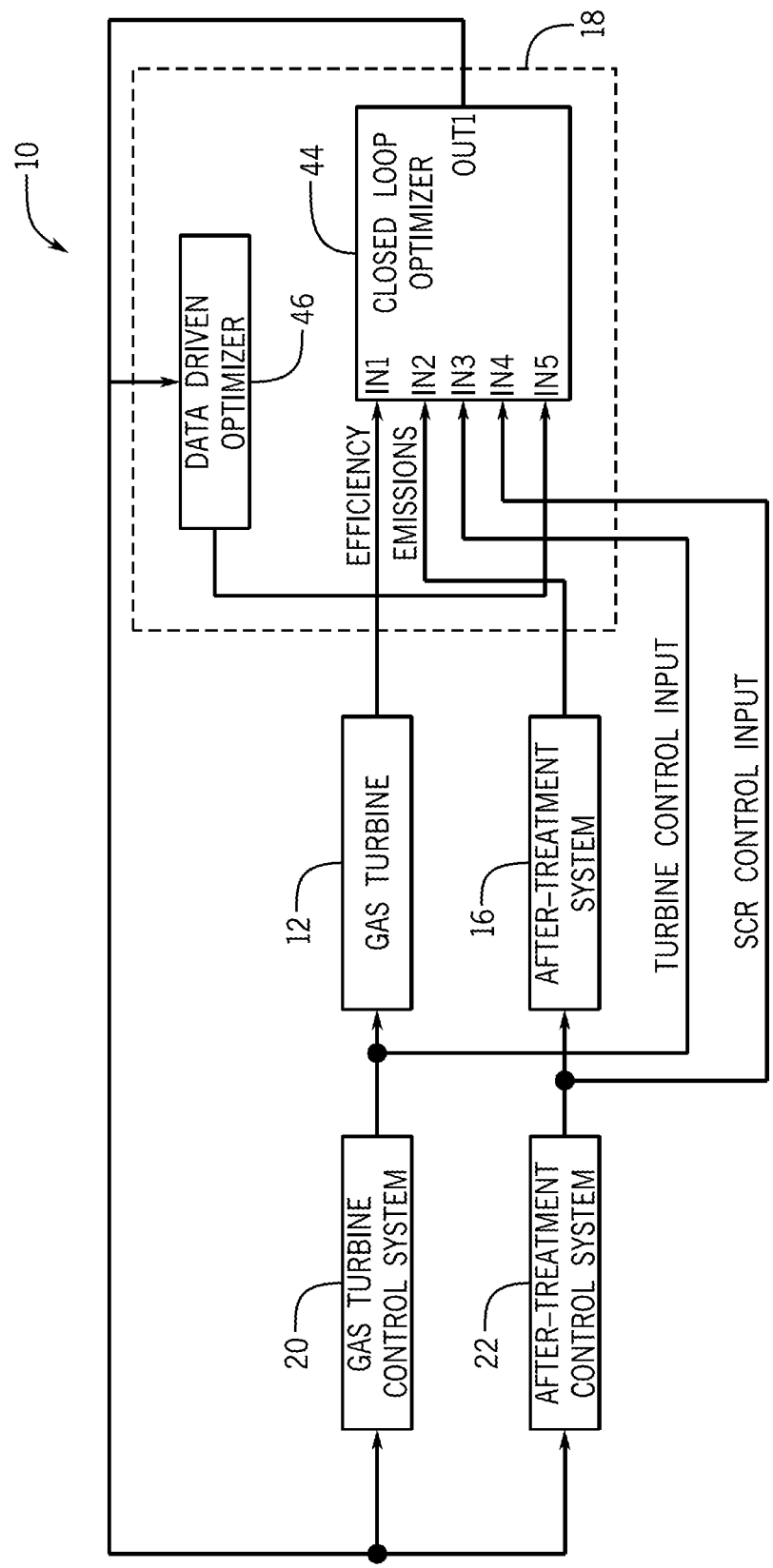
FIG. 2 is a block diagram of an embodiment of a model based and/or data-driven control system including the system of FIG. 1.

FIG. 2 depicts the controller 18 of the system 10 of FIG. 1, including a closed-loop enhancer 44 and a data-driven enhancer 46. In some embodiments, the closed-loop enhancer 44 generates the gas turbine system 10 (e.g., industrial plant) model. It should be noted that, in some embodiments, the data-driven enhancer 46 is not used and the closed-loop enhancer 44 is solely responsible for determining the one or more setpoints to apply to control the gas turbine 12 and/or the after-treatment system 16. As illustrated, the closed-loop enhancer 44 includes five inputs but it should be noted that, in some embodiments, there may be more or less inputs. As an example, a first input may include measured variables (e.g., efficiency, temperature, pressure, exhaust gas temperature, exhaust gas chemical makeup) from the gas turbine 12, a second input may include measured variables (e.g., emissions) from the after-treatment system 16, a third input may include the gas turbine 12 control inputs provided by the gas turbine control system 20, a fourth input may include the after-treatment system 16 control inputs provided by the after-treatment control system 22, and a fifth input may include setpoints from the data-driven enhancer 46. The closed-loop enhancer 44 may perform one or more enhancement techniques in real-time to determine setpoints that are enhanced in some sense (e.g., enhancing the efficiency of the gas turbine 12 and reducing the catalyst out emissions) and output the setpoints to the gas turbine control system 20 and the after-treatment control system 22. The closed-loop enhancer 44 may use a model based control framework with a cost function to determine the setpoints.

In certain embodiments, the controller 18 may receive and analyze sensed outputs (e.g., power, efficiency, emissions) of the gas turbine 12 and the after-treatment system 16 processed via one or more Kalman filters. It should be appreciated that the Kalman filters may be implemented as hardware, software, or combinations thereof. The Kalman filters may each include a set of mathematical equations and computations to efficiently and accurately estimate the state of the gas turbine 12 efficiency and the after-treatment system 16 emissions by implementing one or more recursive functions. For example, the Kalman filters may each receive (as inputs) signals indicating the differences between measured gas turbine 12 operational parameters or operational behavior from various sensors (e.g., sensors and field devices 34 and 36) and the estimated operational parameters output from one or more models (e.g., the gas turbine system 10 model). The Kalman filters may provide input to the gas turbine system 10 model, which can simulate how the gas turbine system 10 (e.g., gas turbine 12 and after-treatment system 16) may react to various setpoints.

The closed-loop enhancer 44 may determine which setpoints reduce a cost function and select those setpoints to output. The cost function may include any suitable performance function, such as an algebraic sum function or sum of the squares function. The cost function may include one or more scalars used to scale the variables based on the desired performance and/or emissions of the gas turbine system 10. The simulations that may be run may use one or more enhancement techniques that searches for a value or set of values from an allowed set of values that minimizes the cost function. The enhancement techniques may include branch and bound search, predictive modeling, linear programming, convex enhancement, or the like. The gas turbine system 10 model may include one or more mathematical functions that model the physical operational behavior of the gas turbine system 10. For example, the gas turbine system 10 model may generate a surface representative of the gas turbine system 10 and simulate how different operational parameter setpoints affect the efficiency of the gas turbine 12 and the emissions of the after-treatment system 16 in relation to the cost function. In some embodiments, the mathematical model may use steady-state and/or dynamic equations, linear and/or non-linear equations, differential equations, gain functions, transfer functions, and/or the like to generate the output used to find the enhanced setpoints.

Branch and bound searching may be used to systematically enumerate candidate setpoints by searching the state space of possible solutions. Searching based on state may include determining setpoints that enable getting from an initial state to a desired goal state. To illustrate, branch and bound searching may include a full set of candidate setpoints at a root of a tree and the technique may explore branches of the tree by simulating different states (e.g., the efficiency of the gas turbine 12 and/or the emissions produced by the after-treatment system 16) at the nodes of the tree. Each branch is checked against upper and lower bounds on the enhanced solution using the cost function to determine whether one solution is better than another. For example, certain solutions may cost more than other solutions and be less desirable. Candidate setpoints that cannot produce a better solution (e.g., lower cost) than the best candidate setpoint found by the techniques are discarded. The best candidate setpoints, such as the setpoints that increase efficiency and reduce emissions to desired levels (e.g., candidate setpoints than generates the lowest cost), are selected as the enhanced solution.

Linear programming may also be used to determine the enhanced setpoints based on at least the desired efficiency of the gas turbine 12 and/or the desired emissions of the after-treatment system 16. Linear programming is a technique for the enhancement of a linear cost function (e.g., objective function), which is subject to linear equality and linear inequality constraints. In some embodiments, linear programming may also use the cost function during its computations to find a solution that produces the lowest cost. Linear programming may use a mathematical model where the constraints and efficiency/emissions are represented by linear relationships and vectors are used for inputs, states, and/or outputs. The output of the model may be one or more setpoints in a generated surface that produce the lowest cost according to the objective function. The setpoints may be output by the controller 18 to the gas turbine control system 20 and/or the after-treatment control system 22 to control the gas turbine 12 and the after-treatment system 16, respectively.

In some embodiments, the one or more setpoints are output to the data-driven enhancer 46, which may be used to perform further analysis using similar or additional data. The data-driven enhancer 46 may include using one or more neural networks and a technique referred to as deep learning to learn the gas turbine system 10 model and modify the setpoints. The setpoints may be correlated with observations from a large amount of sensor data obtained via the sensors and field devices 34 and 36. The data-driven enhancer 46 may analyze the projected setpoints and current observations and then command new setpoints that can be passed to the closed-loop enhancer 44. The closed-loop enhancer 44 can perform additional analysis on the new setpoints or output the new setpoints to the gas turbine control system 20 and/or the after-treatment control system 22. In some embodiments, the data-driven enhancer 46 may output the new setpoints directly to the gas turbine control system 20 and/or the after-treatment control system 22.

Figure 3:
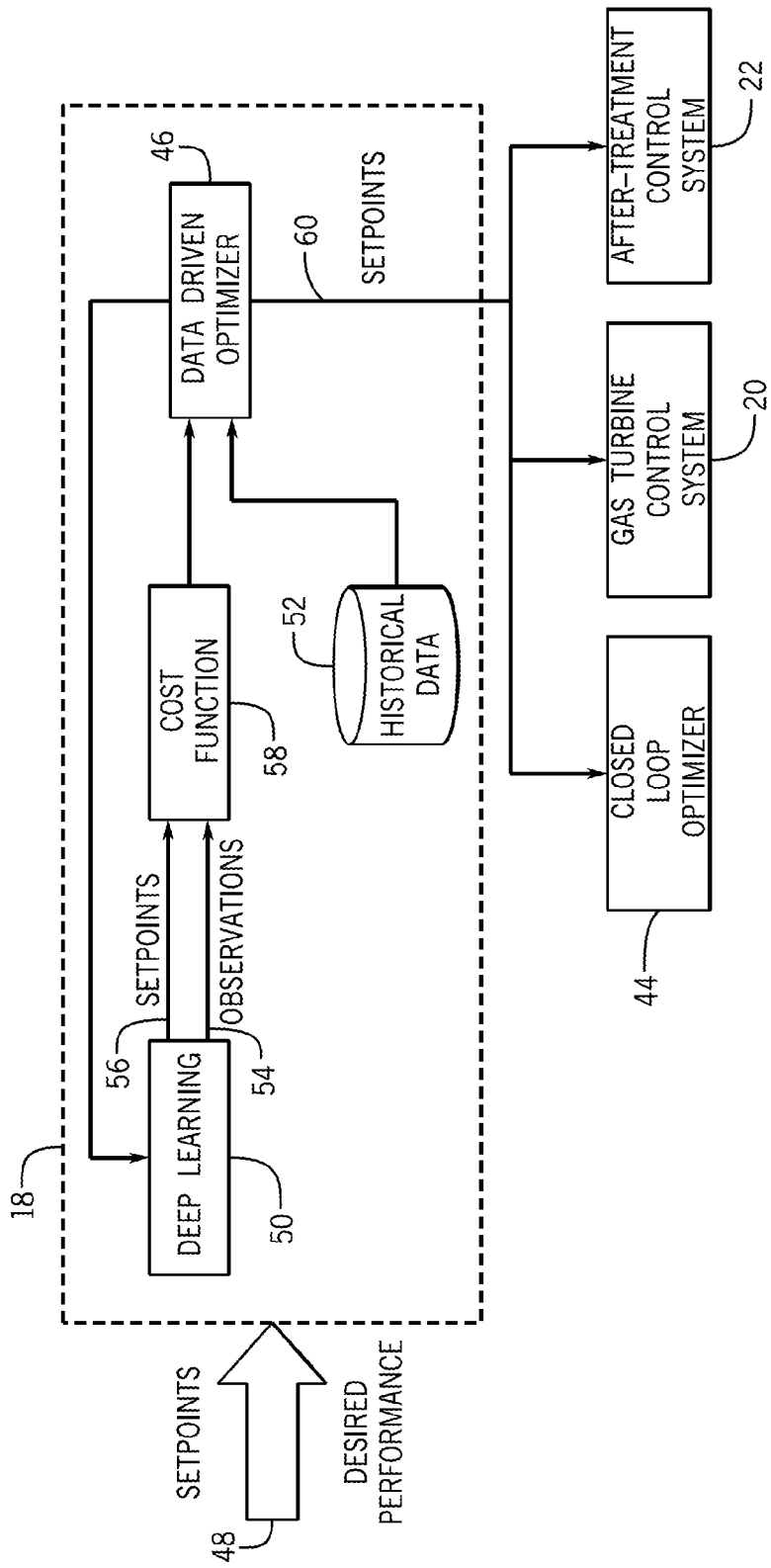
FIG. 3 is a block diagram of an embodiment of a controller executing data-driven control.

FIG. 3 is a block diagram of an embodiment of the data-driven control used performed by the controller 18. The controller 18 may receive the setpoints and/or desired performance of the gas turbine 12 and/or the after-treatment system 16 as inputs (arrow 48). For example, in some embodiments, the controller 18 may receive measured variables of the gas turbine 12, control inputs to the gas turbine 12, measured variables of the after-treatment system 16, and/or control inputs to the after-treatment system 16. It should be noted that, in some embodiments, the closed-loop enhancer 44 is not used and the data-driven enhancer 46 is solely responsible for determining the one or more setpoints to apply to control the gas turbine 12 and the after-treatment system 16. The data-driven enhancer 46 may perform deep learning 50 using the setpoints and data from one or more sensors (e.g., sensors and field devices 34 and 36).

Deep learning component may enables "automatically" learning actionable information from seemingly uncorrelated massive amounts of sensor and controller data while data-driven optimizer directly incorporates historical data into its formulation to make sound decisions under uncertainty and inaccurate sensor information without explicit first-principles-based models. Deep learning may model relatively high-level abstractions of the gas turbine system 10 (e.g., industrial plant) including the gas turbine 12 and the after-treatment system 16 in data using model architecture and one or more non-linear transformations. The controller 18 may analyze sensor data from the sensors and field devices 34, 36 of the gas turbine 12 and the after-treatment system 16 and/or from a historical database 52. In some embodiments, the sensor data may be a relatively high amount of data. The historical database 52 may include the sensor data and/or historical control inputs from the gas turbine 12 and/or the after-treatment system 16 over a time period that they have been operating. The controller 18 may learn how the gas turbine system 10 operates in response to certain inputs based on the sensor data through convolutional neural network architecture for deep learning. In some embodiments, the controller 18 learns multiple layers of representations of the gas turbine system 10, where each successive layer uses the output from the previous layer as input. Example layers include filtering layers, activation layers, and/or pooling layers. The deep learning method learns the filtering coefficients relevant to the operation of the gas turbine. In some embodiments, the filtering layer may include a multi-input, multi-output linear time-invariant system that performs convolution, and the activation layer may perform a nonlinear transformation. Deep learning 50 may be supervised to perform classifications of data and/or unsupervised to perform pattern analysis. Also, the controller 18 may correlate the sensor data to inputs, outputs, and various states of the gas turbine system 10 during deep learning 50. In some embodiments, the controller 18 may use a neural network to analyze the correlations and make one or more observations (line 54) during deep learning 50. The observations may include a vector of objects, which may be scaled using one or more scalars. The scalars may represent an estimated response based on operational parameter setpoints and the learned sensor data. In some embodiments, the observations may include a set of edges, regions, or the like. In addition, the controller 18 may determine one or more setpoints (line 56) as a result of performing deep learning 50. The setpoints may include one or more operational parameters for the gas turbine 12 and the after-treatment system 16 that are determined to obtain a desired operating state of the gas turbine system 10.

The controller 18 may process the setpoints 56 and observations 54 through a cost function 58. The cost function 58 may be similar to the cost function used by the closed-loop enhancer 44 described above. For example, the cost function 58 may include an algebraic function, a sum of the squares function, or a function capable of evaluating a cost of setpoints using weighted variables (e.g., a scalar function). In some embodiments, the variables may include efficiency and emissions and the variables may be weighted as desired (e.g., to minimize emissions and maximize efficiency). The data-driven enhancer 46 may select the setpoints 56 that generate the lowest value (e.g., cost) from the cost function. However, the data-driven enhancer 46 may correlate the setpoints 56 with the observations 54, and if the data-driven enhancer 46 determines that there is a discrepancy between the setpoints 56 and the observations 54, the data-driven enhancer 46 may inject the different sensor data from the historical database 52 and return to the deep learning 50 phase to generate new setpoints with the updated sensor data.

The setpoints (line 60) that are selected by the data-driven enhancer 46 may be output to the closed-loop enhancer 44, the gas turbine control system 20, and/or the after-treatment control system 22. The closed-loop enhancer 44 may process the setpoints and various inputs (e.g., control inputs and measured variables) through the gas turbine system 10 model and select the setpoints that generate lowest relatively low cost to output to control the gas turbine 12 and/or the after-treatment system 16. In embodiments where the closed-loop enhancer 44 is not used, the data-driven enhancer 46 may output the setpoints 60 directly to the gas turbine control system 20 and/or the after-treatment control system 22. It is worth noting that using deep learning 50 with the data-driven enhancer 46 may enable accounting for uncertainties that arise in the operation of the gas turbine system 10 as the online time of gas turbine system 10 components increases by injecting the updated sensor readings as they occur. In other words, using current and historical sensor data may enable the data-driven enhancer 46 to obtain an accurate "picture" of the gas turbine system 10 and how the gas turbine system 10 reacts to various inputs.

Figure 4:
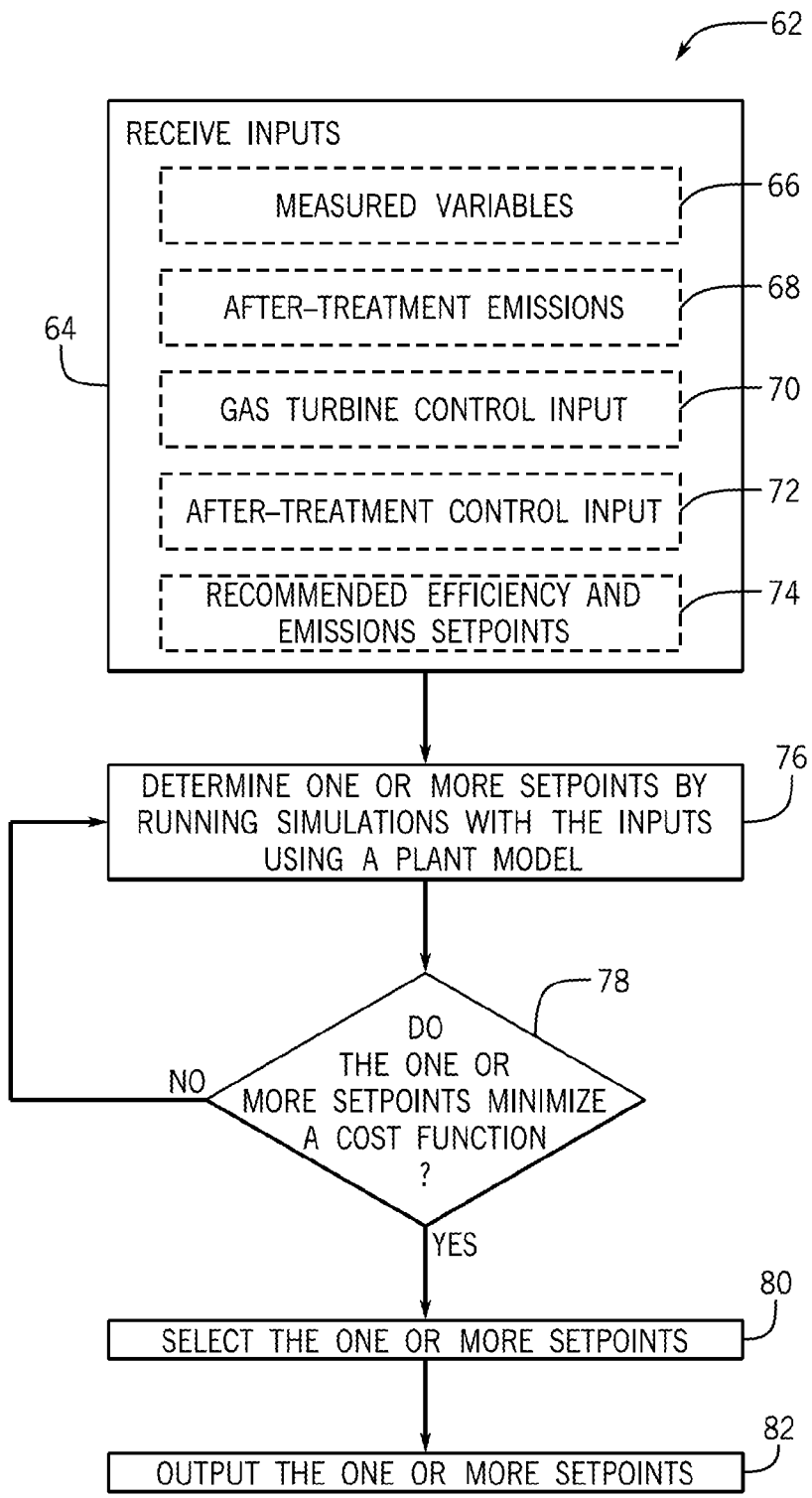
FIG. 4 is a flow diagram of an embodiment of a method suitable for controlling a gas turbine system using model based control.

FIG. 4 is a flow diagram of an embodiment of a method 62 suitable for controlling a gas turbine system 10 using model based control by using, for example, the controller 18. The method 62 may include code or instructions stored in a non-transitory machine-readable medium (e.g., a memory) and executed, for example, by one or more processors included in the controller 18. Although the following description of the method 62 is described with reference to the processor of the controller 18, it should be noted that the method 62 may be performed by other processors disposed on other devices that may be capable of communicating with the gas turbine 12 and/or the after-treatment system 16, such as the gas turbine control system 20, the after-treatment control system 22, or other components associated with the gas turbine system 10. Additionally, although the following method 62 describes a number of operations that may be performed, it should be noted that the method 62 may be performed in a variety of suitable orders and all of the operations may not be performed and additional operations may be added. It should be appreciated that the method 62 may be wholly executed by the controller 18 or the execution may be distributed between the controller 18, the gas turbine control system 20, and/or the after-treatment control system 22.

Referring now to the method 62, the controller 18 may receive inputs (block 64). The inputs may include certain measured variables 66 from the sensors and field devices 34 and 36, such as gas turbine efficiency and after-treatment emissions 68. Also, the inputs may include gas turbine control inputs 70 and after-treatment control inputs 72. In some embodiments, the inputs may include recommended operational parameter setpoints selected by the data-driven enhancer 46. The controller 18 may determine one or more setpoints by running simulations with the inputs using a gas turbine system 10 model (block 76). As discussed above, the gas turbine system 10 model may include numerous mathematical functions that receive operational parameters and/or states as inputs to determine the output response of a portion of the gas turbine system 10. It should be understood that the gas turbine system 10 model encompasses the functional relationship between the gas turbine 12 and the after-treatment system 16. The simulations may apply one or more enhancement techniques when searching for the enhanced solution using the gas turbine system 10 (e.g., industrial plant) model.

The controller 18 may determine whether the one or more setpoints reduce the cost function (block 78). Variables in the cost function may be weighted according to the user preference or by facility. For example, an efficiency variable may be more heavily weighted if the user desires the gas turbine 12 to perform more efficiently, an emissions variable may be more heavily weighted if the user desires the after-treatment system 16 to produce less emissions or emissions with less NOx, or both variables may be weighted evenly if the user desires increased efficiency and reduced emissions. If the setpoints do not reduce the output of the cost function or may be reduced further, then the controller 18 may return to block 76 to determine additional setpoints. If the setpoints produce a reduced output value (e.g., cost) of the cost function, then the controller 18 may select the one or more setpoints (block 80) and output the one or more setpoints (block 82). As previously discussed, the output may be sent to the gas turbine control system 20, the after-treatment control system 22, and/or the data-driven enhancer 46 for further processing using deep learning.

Figure 5:
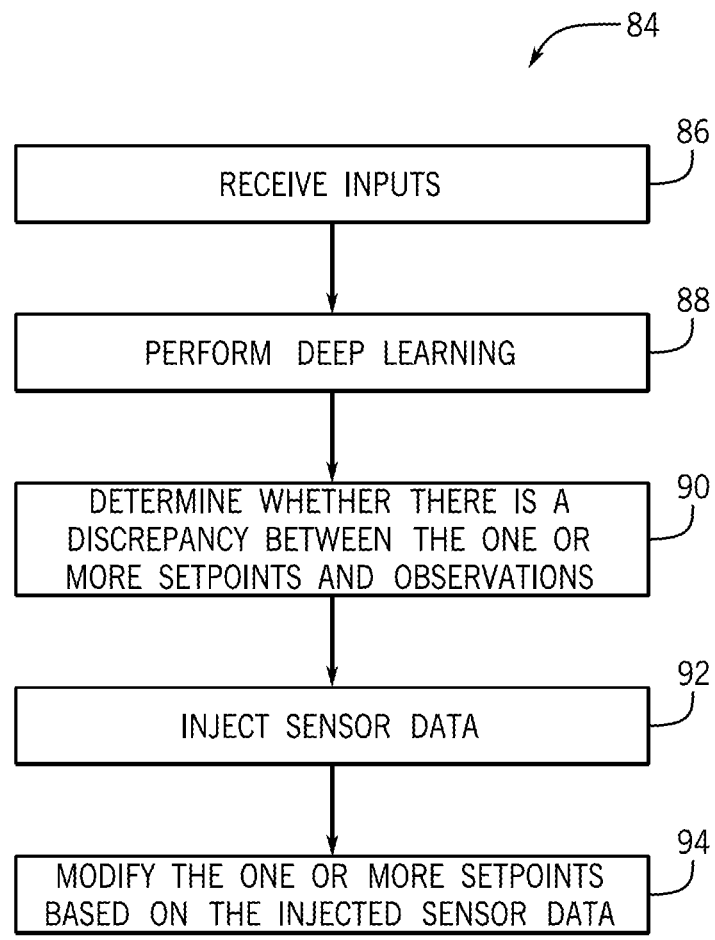
FIG. 5 is a flow diagram of an embodiment of a method suitable for controlling the gas turbine system using data-driven control.

FIG. 5 is a flow diagram of an embodiment of a method 84 for controlling the gas turbine system 10 using data-driven control via the data-driven enhancer 46. The method 84 may include code or instructions stored in a non-transitory machine-readable medium (e.g., a memory) and executed, for example, by one or more processors included in the controller 18. Although the following description of the method 84 is described with reference to the processor of the controller 18, it should be noted that the method 84 may be performed by other processors disposed on other devices that may be capable of communicating with the gas turbine 12 and/or the after-treatment system 16, such as the gas turbine control system 20, the after-treatment control system 22, or other components associated with the gas turbine system 10. Additionally, although the following method 84 describes a number of operations that may be performed, it should be noted that the method 84 may be performed in a variety of suitable orders and all of the operations may not be performed. It should be appreciated that the method 84 may be wholly executed by the controller 18 or the execution may be distributed between the controller 18, the gas turbine control system 20, and/or the after-treatment control system 22.

Referring now to the method 84, the controller 18 may receive one or more inputs (block 86). The inputs may include one or more setpoints from the closed-loop enhancer 44, measured variables from the gas turbine 12, measured variables from the after-treatment system 16, control inputs to the gas turbine 12, and/or control inputs to the after-treatment system 16. The controller 18 may perform deep learning 50 (block 88) to generate modified setpoints and/or observations. In some embodiments, the observations may include correlations between setpoints and sensor data. For example, setting certain operational parameters of the gas turbine 12, such as a turbine 26 speed, may result in a certain efficiency and/or production of NOx in emissions. When there is an abundance of ammonia stored in the after-treatment system 16, the controller 18 may determine that generating more NOx in the emissions will cause a reaction with the ammonia and lower the amount of ammonia stored in the catalyst.

Returning to the method 84, the controller 18 may determine whether there is a discrepancy between the one or more setpoints and observations (block 88). For example, when the operational parameter setpoint does not cause an expected response from the gas turbine 12 and/or the after-treatment system 16, the controller 18 may inject the actual sensor data (block 92) into the data-driven enhancer 46 so the actual sensor data can be accounted for in deep learning 50. The data-driven enhancer 46 may modify the one or more setpoints based on the injected sensor data (block 94), which may enable selecting finely tuned setpoints that cause the desired response (e.g., efficiency and/or emissions) from the gas turbine 12 and/or the after-treatment system 16.

Technical effects of the disclosure include gas turbine system 10 level (e.g., industrial plant-level) enhancement by generating setpoints for a gas turbine 12 and an after-treatment system 16 in real-time. In some embodiments, a gas turbine system 10 model may be generated that models the operational relationship between the gas turbine 12 and the after-treatment system 16. Also, in some embodiments, data-driven control may be used to supplement the model based control or may be used independently. The data-driven control may perform deep learning of the gas turbine system 10 based on a large amount of sensor data and historical inputs. The model based control and data-driven control may both select setpoints that minimize output of a cost function. The cost function may be weighted as desired (e.g., enhance efficiency, reduce emissions, or both). Some commercial advantages of the disclosed techniques may include staying in compliance for an extended period of time and providing catalyst health monitoring while reducing the fuel costs and lifetime operating costs for customers.

This written description uses examples to disclose the subject matter, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine system comprising:
a gas turbine;
an after-treatment system configured to receive exhaust gases from the gas turbine system; and
a controller configured to:
receive inputs;
model operational behavior of an industrial plant based on the inputs, wherein the industrial plant comprises the gas turbine and the after-treatment system;
determine one or more operational parameter setpoints for the industrial plant;
select the one or more operational parameter setpoints that reduce an output of a cost function; and
apply the one or more operational parameter setpoints to control the industrial plant;
wherein the selected one or more operational parameter setpoints cause the gas turbine to output a higher amount of carbon monoxide and a lesser amount of nitric oxide such that the carbon monoxide is oxidized in an oxidation catalyst upstream of the after-treatment system and nitric oxide is reduced in the after-treatment system.

2. The system of claim 1, wherein the inputs comprise measured variables of the gas turbine, measured variables of the after-treatment system, control inputs to the gas turbine, control inputs to the after-treatment system, or some combination thereof.

3. The system of claim 1, wherein the cost function comprises variables representing efficiency of the gas turbine and emissions of the after-treatment system.

4. The system of claim 3, wherein the variables are weighted to increase the efficiency of the gas turbine and to reduce the emissions of the after-treatment system.

5. The system of claim 1, wherein the selected one or more operational parameter setpoints cause the gas turbine to output additional nitric oxide in the exhaust gases when the controller determines that there is a level of ammonia stored in the after-treatment system that exceeds a threshold.

6. The system of claim 5, wherein the additional nitric oxide chemically reacts with the stored ammonia to lower the level of ammonia to reduce nitric oxide/ammonia slip.

7. The system of claim 1, wherein the one or more operational parameter setpoints are configured to cause the industrial plant to maintain emission compliance requirements while improving fuel economy and efficiency of the gas turbine.

8. The system of claim 1, wherein the processor is configured to determine whether a catalyst in the after-treatment system is aging based on an amount of ammonia in the catalyst.

9. The system of claim 1, wherein the controller is configured to:
perform deep learning of the industrial plant using a data-driven enhancer to generate one or more observations of the industrial plant;
determine when there is a discrepancy between the one or more operational parameter setpoints and the one or more observations;
inject updated sensor data into the data-driven enhancer when there is a discrepancy; and
determine one or more new operational parameter setpoints using the data-driven enhancer based on the updated sensor data.

10. A method, comprising:
receiving, via a controller, inputs;
modeling, via the controller, operational behavior of a gas turbine system based on the inputs, wherein the gas turbine system comprises an industrial plant that includes a gas turbine connected to an after-treatment system;
determining, via the controller, one or more operational parameter setpoints for the industrial plant;
selecting, via the controller, the one or more operational parameter setpoints that minimize an output of a cost function;
and applying, via the controller, the one or more operational parameter setpoints to control the industrial plant;
wherein the selected one or more operational parameter setpoints cause the gas turbine to output a higher amount of carbon monoxide and a lesser amount of nitric oxide such that the carbon monoxide is oxidized in an oxidation catalyst upstream of the after-treatment system and nitric oxide is reduced in the after-treatment system.

11. The method of claim 10, wherein the inputs comprise measured variables of the gas turbine, measured variables of the after-treatment system, control inputs to the gas turbine, control inputs to the after-treatment system, or some combination thereof.

12. The method of claim 10, comprising:
performing deep learning of the industrial plant using a data-driven enhancer to generate one or more observations of the industrial plant;
determining when there is a discrepancy between the one or more operational parameter setpoints and the one or more observations;
injecting updated sensor data into the data-driven enhancer when there is a discrepancy; and
determining one or more new operational parameter setpoints using the data-driven enhancer based on the updated sensor data.

13. The method of claim 12, comprising receiving the updated sensor data from a plurality of sensors coupled to the gas turbine and the after-treatment system or a historical database configured to store the updated sensor data.

14. The method of claim 12, wherein performing deep learning comprises using a neural network to process the one or more operational parameter setpoints through one or more layers, wherein each layer of the one or more layers comprises filtering layers, activation layers, pooling layers, or some combination thereof, and the filtering layer comprises a multi-input, multi-output linear time-invariant system, and the activation layer performs a nonlinear transformation.

15. A non-transitory computer-readable medium having computer executable code stored thereon, the code comprising instructions that, when executed by a processor, are configured to cause the processor to:
receive inputs;
model operational behavior of a gas turbine system based on the inputs, wherein the gas turbine system comprises an industrial plant that includes a gas turbine connected to an after-treatment system;
determine one or more operational parameter setpoints for the industrial plant;
select the one or more operational parameter setpoints that minimize an output of a cost function; and
apply the one or more operational parameter setpoints to control the industrial plant;
wherein the selected one or more operational parameter setpoints cause the gas turbine to output a higher amount of carbon monoxide and a lesser amount of nitric oxide such that the carbon monoxide is oxidized in an oxidation catalyst upstream of the after-treatment system and nitric oxide is reduced in the after-treatment system.

16. The non-transitory computer-readable medium of claim 15, wherein the inputs comprise measured variables of the gas turbine, measured variables of the after-treatment system, control inputs to the gas turbine, control inputs to the after-treatment system, or some combination thereof.

17. The non-transitory computer-readable medium of claim 15, wherein the code comprises instructions configured to cause the processor to:
perform deep learning of the industrial plant using a data-driven enhancer to generate one or more observations of the industrial plant;
determine when there is a discrepancy between the one or more operational parameter setpoints and the one or more observations;
inject updated sensor data into the data-driven enhancer when there is a discrepancy; and
determine one or more new operational parameter setpoints using the data-driven enhancer based on the updated sensor data.

18. The non-transitory computer-readable medium of claim 15, wherein the code comprises instructions configured to cause the processor to reduce nitric oxide and ammonia slip from a catalyst in the after-treatment system while improving efficiency and fuel economy of the gas turbine by commanding the gas turbine to output additional nitric oxide using the one or more operational parameters that reacts with ammonia stored in a catalyst of the after-treatment system.

19. The non-transitory computer-readable medium of claim 15, wherein the code comprises instructions configured to cause the processor to model the operational behavior of the industrial plant in a closed loop in real-time.

* * * * *